US012393877B2

(12) United States Patent  
Kennel et al.

(10) Patent No.: US 12,393,877 B2  
(45) Date of Patent: Aug. 19, 2025

(54) ATTRIBUTING REASONS TO PREDICTIVE MODEL SCORES WITH LOCAL MUTUAL INFORMATION

(71) Applicant: FAIR ISAAC CORPORATION, Minneapolis, MN (US)

(72) Inventors: Matthew Bochner Kennel, San Diego, CA (US); Scott Michael Zoldi, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 18/506,031

(22) Filed: Nov. 9, 2023

(65) Prior Publication Data

US 2024/0078475 A1    Mar. 7, 2024

Related U.S. Application Data

(63) Continuation of application No. 16/700,982, filed on Dec. 2, 2019, now Pat. No. 11,875,232.

(51) Int. Cl.
*G06N 20/00* (2019.01)
*G06F 17/18* (2006.01)

(52) U.S. Cl.
CPC ............. *G06N 20/00* (2019.01); *G06F 17/18* (2013.01)

(58) Field of Classification Search
None
See application file for complete search history.

(56) References Cited

U.S. PATENT DOCUMENTS 9,483,727 B2    11/2016    Zhao et al.

FOREIGN PATENT DOCUMENTS

EP            4184396 A1 *  5/2023   ............. G06N 20/00

* cited by examiner

*Primary Examiner* — Walter L Lindsay, Jr.
*Assistant Examiner* — Geoffrey T Evans
(74) *Attorney, Agent, or Firm* — Mintz, Levin, Cohn, Ferris, Glovsky and Popeo, P.C.; F. Jason Far-hadian, Esq.

(57) ABSTRACT

Systems and methods for providing insights about a machine learning model are provided. The method includes, using training data to train the machine learning model to learn patterns to determine whether data associated with an event provides an indication that the event belongs to a certain class from among a plurality of classes, evaluating one or more features of the machine learning model to produce a data set pairing observed scores S and a set of predictive input variables $V_i$, and constructing at least one data-driven estimator based on an explanatory statistic, the estimator being represented in a computationally efficient form and packaged with the machine learning model and utilized to provide a definition of explainability for a score generated by the machine learning model.

20 Claims, 3 Drawing Sheets

ATTRIBUTING REASONS TO PREDICTIVE MODEL SCORES WITH LOCAL MUTUAL INFORMATION

CROSS-REFERENCE TO RELATED APPLICATIONS

This Application is a continuation of and claims priority to the earlier filing date of U.S. patent application Ser. No. 16/700,982, filed on Dec. 2, 2019, the content of which is hereby incorporated by reference herein in its entirety.

FIELD

The disclosed subject matter relates generally to the field of computational scoring, using machine learning models, and more specifically to technical improvement in computer-implemented machine learning systems to promote the efficient and accurate explanation of factors that contribute to scores generated by a machine learning model.

BACKGROUND

Supervised machine learning models are computational models that are capable of representing, through complex non-linearities in input data, a predictive relationship between a set of input variables (i.e., "features") and a value of one or more output labels or outcomes. Typically, training or development data, comprising the input variables and known outputs, is provided to a machine learning training algorithm, which assigns values to free parameters in the machine learning model such that the model can be used to predict the a priori unknown output label, or the predicted distribution, given the set of input features.

The unsupervised variant of machine learning models does not use an output label but learns to classify the inputs and provide output values relating to how common or uncommon the values of input variables are compared to the distribution found in the development training set. High performing machine learning models (e.g., artificial neural networks, support vector machines, large ensembles of decision trees, etc.) used by contemporary practitioners, arrive at results and typically generate a single score based on machine learning features and data relationships that are non-linear and opaque to human interpretation. For this reason, some machine learning models are referred to as "black boxes" that generate results without the user understanding how the black box functions.

Having a single score generated as the result for the evaluation of a problem that has many facets and requires the consideration of many interdependent relationships provides a human operator or a computing machine with an easy and simple means for evaluating the problem. For example, a machine learning model may generate one or more scores that can be used to make important business decisions that materially and practically impact people and organizations. Examples of the practical uses or applications of the results generated include flagging a payment card account as being used fraudulently, allowing or denying a loan application, or alerting that a computer system has been compromised by illegal intrusion.

While relying one or more scores is advantageous for the purpose of simplicity and efficiency in decision making, concerns about fairness and accuracy often require a follow-on deeper investigation or explanation to a customer or regulator about how the score was calculated or at least an understanding of the basis for the generation of the score and how the black box machine learning model generates the score. For example, a frequent requirement for the operational success and acceptance of a machine learning model is an easy to understand explanation of the most salient reasons why or how the model arrived at the observed score or result given the relevant data for a particular instance.

Unfortunately, the currently available machine learning models do not intrinsically provide an explanation of the particular score and cannot disambiguate the black box of the computational algorithm that produces the score. Further, primarily due to the non-linearity exploited by machine learning models and the complexity of inputs that enter into these nonlinear computational nodes, it is difficult to provide a meaningful explanation without drastically simplifying the model architecture. Further, currently available solutions that attempt to provide an understanding of how the model works, often fail to provide a definitive understanding or a definition of explainability for any model more complex than a linear model.

It is desirable to have the most significant inputs and latent features of a model identified and explained in relationship to the score generated by the model, in an efficient and meaningful manner, without depending on the precise details of the underlying model structure. It would be also helpful if the explanation for a model could provide a quantification of the relative strengths of the model features and variables by generating a natural human understandable explanation based on a collective quantification of groups of inputs and the interactions of a model's variables, including those interactions that are non-linear in nature.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more embodiments, a computer-implemented systems, products and methods for providing insights about a machine learning model are provided. Depending on implementation, during a first phase (e.g., training phase), training data may be used to train the machine learning model to learn patterns to determine whether data associated with an event provides an indication that the event belongs to a certain class from among a plurality of classes. During a second phase (e.g., development phase), one or more features of the machine learning model may be used to produce a data set pairing observed scores S and a set of predictive input variables $V_i$; and construct at least one data-driven estimator based on an explanatory statistic based on the one or more features of the machine learning model.

The estimator may be represented in a computationally efficient form and packaged with the machine learning model and utilized to provide a definition of explainability for a score generated by the machine learning model, and the definition of explainability being associated with one or more non-linear features of the machine learning model. The explanatory statistic is a variable relevance statistic (VRS) between the score S and the input variables $V_i$ evaluated as a means of indicating meaningful explanatory variable relationships used by the machine learning model for the generated score.

The set of predictive input variables $V_i$ may be constructed from one or more observations. The predictive input variables considered for the VRS may include the input variables used to compute the model score, as well as composite calculated values of two or more model input variables, such as the hidden unit values in an artificial neural network. The VRS may be evaluated through the estimator between the score, generated during an operational phase, and one or more candidate predictive features. At least one candidate predictive feature or combination of candidate features may be selected with an VRS value that meets a first threshold value as providing the most relevant explanation, and one or more results may be generated based on the at least one selected candidate predictive feature or combination of candidate features to explain the score generated during the operational phase.

In certain embodiments, one or more deduplication or explanatory elucidation procedures are performed to enhance palatability and relevance of the one or more explanations. The VRS is used between the generated score and the variable values as a statistic for ranking plausibility and strength of input features and combinations of features for a scored observation. In response to determining that the VRS does not meet the first threshold value, a corresponding feature or combination of features of the machine learning model is disqualified as a relevant explanation for the generated score. The first threshold value is approximately equal to zero or is less than zero.

The VRS may quantify the degree of co-occurrence between observed values of the score S and one or more variables $V_i$. The VRS may be computed using the current values of S and one of more variables $V_i$, and one or more parameters estimated from a training dataset providing a multitude of examples of paired S and $V_i$. The VRS may take on more extreme values when the score S and one or more variables and combinations $V_i$ take on their observed values simultaneously. Depending on implementation, the VRS takes on more extreme values and the score S and one or more variables and combinations $V_i$ take on their observed values simultaneously, normalized by a computation representing the values expected if the score S and combinations variables $V_i$ were observed independently.

The VRS in some embodiments is computed using probabilities, or probability densities of at least one of S or $V_i$, including at least one of independent, marginal, conditional and joint probability distributions or probability densities. The probabilities or probability densities are determined by at least one of a probability estimator or a probability density estimator, wherein the probability estimator is applicable to variables that take on discrete values, and the probability density estimator is applicable to variables that take on continuous values. One or more copula techniques may be used for constructing the estimator to eliminate the need for estimating marginal densities in computing the VRS.

In accordance with certain embodiments, one or more empirical rank transformation are used for constructing the copula estimator of VRS of the one or more features and the score S. A second transformation to Gaussian distributed space from a unit square is used in order to improve quality of estimation. A Gaussian mixture model may be is used to compactly estimate the joint probability and back transformation to original copula space, yielding a compact and computationally efficient density estimator to evaluate the VRS. Higher values of VRS indicate strong explanatory variables, while lower values of VRS indicate weak explanatory or non-explanatory variables.

In certain implementations, the VRS is used to quantify an explanatory power of pairs, or higher tuples of input features, in which case, when using a probabilistic definition for the VRS, such as LMI, one of the random variables is a composite outer product formed from the tuple of input features. In certain implementations the VRS is used to quantify an explanatory power of a calculated value which is computed from pairs, or higher tuples of input features. A cascaded VRS algorithm, extending the base VRS algorithm, may be used to allocate explanatory statistics when the internal computational structure of information flow is known and the hidden activations are retained for the explanation algorithm.

In one aspect, the VRS is computed using the definition of the local mutual information (LMI) between two observations x and y drawn from random processes X and Y, bearing probability densities $\rho x$, $\rho y$ and joint density $\rho_{XY}$ being defined as follows:

$$LMI(x, y) = \log \frac{\rho_{xy}(x, y)}{\rho_x(x)\rho_y(y)}.$$

In some embodiments employing probabilistic estimators copula techniques may be used for constructing the estimator. In some embodiments, such as the LMI calculation, the copula technique may eliminate the need for estimating marginal densities in accordance with the following formulas copula density $$\text{function} = c(u, v) = \frac{\partial^2 C}{\partial u \partial v}(u, v),$$

connecting to the joint density $\rho_Y(x,y) = \rho_X(x) \cdot p_Y(y) \cdot \rho_c(u = F_X(x), v = F_y(y))$, wherein individual marginal densities x and y cancel, such that LMI $(x, y) = \log \rho_c(F_X(x), F_Y(y))$, and the copula density is estimated based on finite sets of observed data.

In one aspect, a first empirical transformation transforms from observations, x, y (distributed according to random variables X, Y) to uniformly distributed pseudo-observations u, v (each distributed as uniform variates U[0, 1]) by means of an empirical rank transformation. The results of transforming to coordinates with a uniform distribution are followed by a transform to coordinates with Gaussian marginal distributions. The first empirical transformation is formed via ranking:

$$u_i \leftarrow \frac{R_X(x_i)}{1 + N},$$

with $Rx(x) \in [1, N]$ the index of the value x as it occurs in a sorted array of the observations $\{x_i\}$.

The second transformation is a probit transformation: $s \leftarrow \Phi^{-1}(u)$ and $t \leftarrow \Phi^{-1}(v)$ with $\Phi$ being the normal cumulative distribution function, and $^{-1}$ is inverse, transforming from $(0, 1)$ to $(-\infty, +\infty)$. Depending on implementation, one or more probability estimators or probability density estimators are fitted on training data represented in the transformed coordinates. The one or more probability estimators or probability density estimators may include one or more of marginal, conditional or joint distributions of the free variables. In some embodiments, an efficient estimator of the VRS value is estimated in a training phase and may be used in a scoring or inference configuration to enable efficient real-time computation of the VRS in an operational scoring system.

Implementations of the current subject matter may include, without limitation, systems and methods consistent with the above methodology and processes, including one or more features and articles that comprise a tangibly embodied machine or computer-readable medium operable to cause one or more machines (e.g., computers, processors, etc.) to result in operations disclosed herein, by way of, for example, logic code or one or more computing programs that cause one or more processors to perform one or more of the disclosed operations or functionalities. The machines may exchange data, commands or other instructions via one or more connections, including but not limited to a connection over a network.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
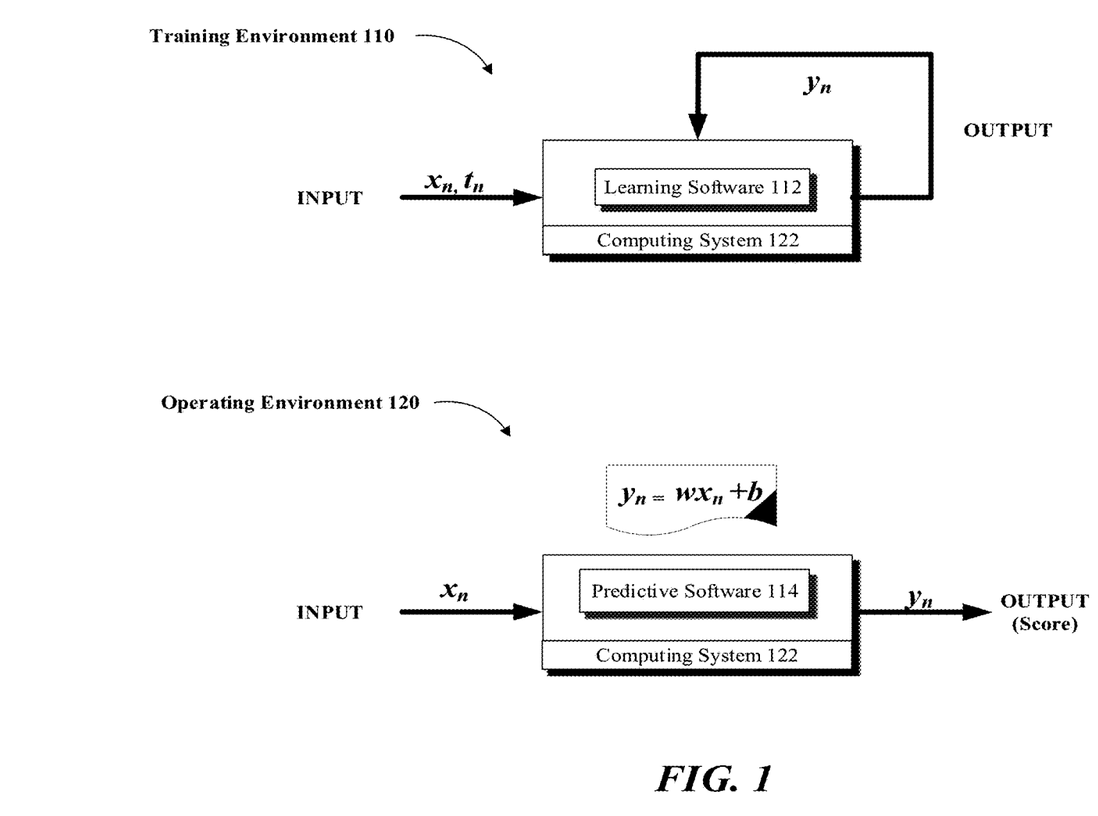
FIG. 1 illustrates example training and operating environments, in accordance with one or more embodiments, wherein an event may be classified as fraudulent or non-fraudulent by a machine learning model.

Referring to FIG. 1, example training environment 110 and operating environment 120 are illustrated. As shown, a computing system 122 and training data may be used to train learning software 112. Computing system 122 may be a general purpose computer, for example, or any other suitable computing or processing platform. Learning software 112 may be a machine learning or self-learning software that receives event-related input data. In the training phase, an input event may be known as belonging to a certain category (e.g., fraudulent or non-fraudulent) such that the corresponding input data may be tagged or labeled as such.

In accordance with one or more embodiments, learning software 112 may process the input data associated with a target event, without paying attention to the labels (i.e., blindly), and may categorize the target event according to an initial set of weights (w) and biases (b) associated with the input data. When the output is generated (i.e., when the event is classified by learning software 112), the result may be checked against the associated labels to determine how accurately learning software 112 is classifying the events.

In the initial stages of the learning phase, the categorization may be based on randomly assigned weights and biases, and therefore highly inaccurate. However, learning software 112 may be trained based on certain incentives or disincentives (e.g., a calculated loss function) to adjust the manner in which the provided input is classified. The adjustment may be implemented by way of adjusting weights and biases associated with the input data. Through multiple iterations and adjustments, the internal state of learning software 112 may be continually updated to a point where a satisfactory predictive state is reached (i.e., when learning software 112 starts to more accurately classify the inputted events at or beyond an acceptable threshold).

In the operating environment 120, predictive software 114 may be utilized to process event data provided as input. It is noteworthy that, in the operating phase, input data is unlabeled because the classification (e.g., the fraudulent nature) of events being processed is unknown to the model. Software 114 may generate an output that classifies a target event as, for example, belonging to a first class (e.g., the fraudulent category), based on fitting the corresponding event data into the first class according to the training data received during the training phase. In accordance with example embodiments, predictive software 114 may be a trained version of learning software 112 and may be executed over computing system 122 or another suitable computing system or computing infrastructure to generate one or more scores that can be used to make determinations about an event (e.g., a fraudulent transaction), an applicant (e.g., loan approval) or other activity.

As noted earlier, in the context of the operational use of machine learning scores, it may be important to provide explanations of the scores to the stakeholders who are interested in reasoning that match the business domain, not explanations primarily geared to quantitative model developers. For example, reasons may need to be provided when the score is used to reject a customer's loan application. In fraud and cybersecurity applications, the score is usually used to accept or block transactions and the explanation algorithm provides guidance to analysts where to start their investigation of fraud. It is noteworthy that while example implementations provided herein may refer to using computational modeling and machine learning to generate a score used for detecting fraud or apply to events involving financial transactions, such example implementations and details should not be construed as limiting the scope of the disclosed subject matter to the particular embodiments or fields of use.

In one or more embodiments, explanations may be provided for individual observations and scores, and not for the overall predictive worth of various features in a model, or generally, techniques to assist model developers. Overall feature sensitivity is important to model developers but is distinctly a different problem from operationalized explanations for individual observations required by explainable artificial intelligence (AI). For example, an operational scoring system in a business context, such as real-time financial transaction scoring may impose technical constraints on computational resource consumption, and societal and regulatory requirements on palatability and sensibility to an outside customer or client.

Further, in certain implementations, instead of or in addition to, a single universal, objective definition of an explanation for a score of a machine learning model, an explanation model and computational technique may be provided to explain a model's scores base on the notion that the model itself is a summarized description of probabilities and trends in the real-world dataset, and the explanations of scores in terms of underlying features may be coherent with properties of that dataset and the real world situation which generated it, meaning heuristically sensible and probabilistically consistent with large-scale observed trends in the dataset.

One approach to addressing explainability in machine learning models, distinct from our notion of VRS, is sensitivity. That is, given an input array of variable values, and the output score, successively set, one at a time, a variable to zero, or some other reference value such as its ensemble average, and re-score the model with the perturbed inputs, and measure the difference in the score so obtained from the true value using the actually observed variable values. The variables whose perturbations give the largest difference are considered to be the most salient explanations for the score. A variation may be to make small perturbations and estimate local derivatives of the model with finite differences. This approach has a number of disadvantages in the case of general nonlinear models:

1. The computational burden for scoring is multiplied substantially above a score alone, as for M input variables (which may be in the dozens to thousands), M+1 scorings of the model may be run.
2. The model is evaluated in areas of state space (with perturbed values) that it has never been trained upon. Machine learning models may give wild scores in such cases, including when attempting to estimate derivatives.
3. The results are not necessarily invariant to a new calibration of scores through a monotonic order-preserving mapping, or a changed representation of input variables through such types of mapping.
4. The sensitivity does not relate to the contributing factors or explanations why the non-perturbed values received a score, only the sensitivity of variable on the manifold which makes the method often wrong as it measures sensitivity to changes in values vs. the nominal value of the state vector that we are providing the score.

In some aspects, the perturbed value is an infinitesimal difference from the reference value, yielding the local gradient of the score with respect to input features. With some model architectures, the gradient may be more efficiently computed analytically. Using an analytical approach, it may not clear that a nonlinear model the size of the local gradient components around the observed point reflect a human-friendly concept of "explanation" which more generally refers to the large-scale drivers of a score of the nominate state values. Machine learning models may not be necessarily trained to limit local gradients or match the unobserved true derivatives, but to minimize a prediction loss, and the values may not often be reliable.

Furthermore, the concept of a gradient with respect to a binary or categorical input feature may be unclear. For example, in the case of a purely linear model, where local model is the global model, these considerations do not apply and the additive nature of the model itself is used to define the explanatory contributions of the input features as their contributions (Variable value multiplied by a coefficient beta) to the global sum, which is the score itself. In this case, the explanation method is sound as $\beta_i^*$ variable reflects an importance to the score in terms of the size of that contribution to the overall score.

Sensitivity methods have a deficiency of not explicitly using probability distributions of the datasets. For example, predicting a college student's height by knowing his shoe size and if he is on the varsity basketball team and possibly other information. Suppose the average height difference between basketball players and an average person is 6 inches and the difference between a size 15 shoe wearer and average shoe wearer is also six inches. Suppose our model observes a basketball player with a size 15 shoe and predicts a height of 82 inches (6'10"). Which of these variables is the best explanation for producing such a high predicted height? A sensitivity analysis or local linearization might say the two contribute equally.

A different explanation algorithm may choose the variable "is-on-basketball-team" as the dominant explanation, agreeing with human intuition, because the probability that a man is 82 inches given he is on a basketball team is much higher than the probability that man is 82 inches given that he wears size 15 shoes. It is a requirement that competitive basketball players be tall, so knowing a person is on a basketball team is exceptionally predictive of a high height. Yet some people without extreme height have large feet naturally. Previewing our claimed method, the joint probability of observing "is-on-basketball-team=true" and "score=82" is far higher than the individual marginal probabilities of those events taken independently, and that ratio is higher than if the shoe-size were substituted for is-on-basketball-team.

A trained machine learning model might also give sensitivities matching intuition for these features, but it is not guaranteed, particularly in the presence of numerous inputs, many of which may be partially co-correlated, and for any specific algorithm. An explanation algorithm yielding palatable and sensible results accompanying specific scores and observations, in certain embodiments, may use explicit probabilistic information found directly in the dataset itself. Sensitivity methods have their utility in the model construction phase, with ensemble averages taken, but this is not the setting of our invention.

In one embodiment of other work, an explanation of the model may be provided based on a related model that is an approximation of the original model in various aspects but is substantially more interpretable. A variety of existing reason attribution methods may be provided as variants of an "additive feature attribution model" locally (i.e. around a specific observation), such that the score is modeled as a linear function of M binary inputs $Z_i$ (one corresponding to the presence or absence of the corresponding real input):

$$s = \phi_0 + \sum_{i=1}^{M} \phi_i z_i$$

The coefficient values correspond to contributions, positive and negative, which collectively add up to the score and the associated variables with the highest magnitude are interpreted to be the most influential reasons for the score.

For example, the Locally Interpretable Model Explanations (LMIE) method directly fits local models of this additive explanation formula around the neighborhood of the currently observed point for which reasons are desired. This technique is computationally expensive, requiring fitting and saving databases of training points for every scored observation requiring explanation. Furthermore, like fitting local gradients, the interpretation of local deviations in score as a function of explanatory inputs is suspect in complex nonlinear models as gradients of many of those model constructions are not at constrained or fitted to match true gradients. Furthermore, even with a faithful estimate, these gradients do not explain how the input state vector produced the score in the important macroscopic senses that humans care about. Small perturbations are not typically acceptable to humans as a plausible explanatory technology. A large gradient component may mean a model's score is noisy/unstable in this region, but it does not tell the user about, for instance, the overall presence of a phenomenon justifying a particularly high, or particularly low score relative to a neutral probability distribution.

In some example implementations of other work, ideas from cooperative game theory may be used as an improved principle for extracting an additive explanation model, but is in the general case, extremely computationally intensive as it requires retraining a very large ensemble of models with features included and excluded, averaging over permutations of input ordering as each ordering conceivably produces a different additive explanation. Certain approximations may be provided that are nevertheless not sufficiently inexpensive. A disadvantage of explanation methods which assume a linear, additive representation is that they cannot fully represent the combined effect of multiple inputs when their explanatory influence is synergistically combined, i.e. greater than each one summed.

For instance, consider a machine learning model to predict a vehicle's required braking distance as a function of variables such as mass, initial velocity, properties of tires, outside temperature, and presence of water on the road surface. Temperature and water interact synergistically to influence braking as the combination below the freezing point of water creates ice which strongly increases braking distance in combination. It is desirable for an explanation method to be able to quantify the saliency of the combined, interacting, influence of two or more variables if desired, without requiring that the combined variable is explicitly constructed by hand and used as an input to the model.

In some implementations, the expected value of the output score as a function of the proposed features is the expectation taken over the empirical probability distribution of a relevant data sample, which is computed and represented in a computationally efficient structure. Quantities relating to the deviation of the observed score from the score expected conditioned on the observed value of the variable or measures related to the difference from an ensemble average may be generated and used to quantify the contribution of that variable to the score, given the observed inputs. These methods have the following properties: (a) they are not a variation of a linearization which underlies a derivatives approach, (b) they do not use or rely on specific computational properties of the predictive model, and (c) they are sensitive to the data distribution of data, and require a training phase of the development data.

Figure 2:
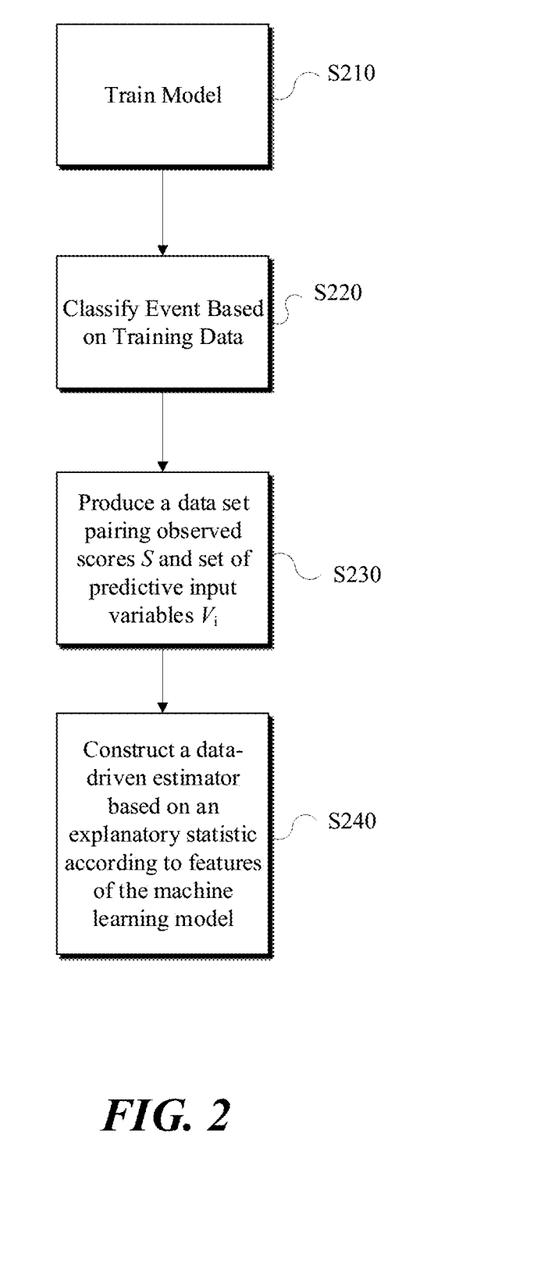
FIG. 2 is an example flow diagram of a method of providing insights about a machine learning model, in accordance with one embodiment.

Referring to FIG. 2, in accordance with example implementations, during a first phase (e.g., training phase), training data may be used to train the machine learning model (S210). Based on the training data the models learns patterns to determine whether data associated with an event provides an indication that the event belongs to a certain class from among a plurality of classes (S220). During a second phase (e.g., development phase), one or more features of the machine learning model may be used to produce a data set pairing observed scores S and a set of predictive input variables $V_i$ (S230) to construct at least one data-driven estimator based on an explanatory statistic based on the one or more features of the machine learning model (S240).

In one or more embodiments, an explanatory statistic may be a variable relevance statistic (VRS) between the score S and the input variables Vi evaluated as a means of indicating meaningful explanatory variable relationships may be used by the machine learning model for the generated score. The VRS quantifies the degree of co-occurrence between observed values of the score S and one or more variables Vi and may be computed using the current values of S and one of more variables Vi, and one or more parameters estimated from a training dataset providing a multitude of examples of paired S and Vi. The VRS may take on more extreme values when the score S and one or more variables and combinations Vi take on their observed values simultaneously.

In certain embodiments, the VRS takes on more extreme values and the score S and one or more variables and combinations Vi take on their observed values simultaneously, normalized by a computation representing the values expected if the score S and combinations variables Vi were observed independently. The VRS may be computed using probabilities, or probability densities of at least one of S or Vi, including at least one of independent, marginal, conditional and joint probability distributions or probability densities, for example. The probabilities or probability densities may be determined by at least one of a probability estimator or a probability density estimator, wherein the probability estimator is applicable to variables that take on discrete values, and the probability density estimator is applicable to variables that take on continuous values.

The probability estimator or the probability density estimator, in some aspects are at least one of a histogram estimator, a kernel density estimator, a support vector machine density estimator, a probabilistic mixture model density estimator, a neural network-based density estimator, a parametric mixture model based density estimator, or a Gaussian mixture model based density estimator. One or more copula techniques may be used for constructing the estimator. A compactly representable form of a probability estimation technique may be used to enable efficient real-time computation of the VRS in an operational scoring phase, providing explicit dependence of the VRS on probabilistic features and relationships of features of training data.

In accordance with example embodiments, the estimator of the VRS value is computed using machine learning techniques, including at least one of linear and non-regression models, artificial neural networks, decision trees, decision tree ensembles, or support vector machines. The estimator of VRS value may be also computed using machine learning techniques as an approximation to an estimated VRS value computed using a probabilistic estimation technique on training data. In some aspects, one or more copula techniques are used for constructing the estimator in a fashion that eliminate need for estimating marginal densities in computing the VRS. One or more empirical rank transformation may be used for constructing the copula estimator of VRS of the one or more features and the score S.

In certain aspects, the VRS is computed using the definition of the local mutual information (LMI) between two observations x and y. Specific values may be herein notated with lower case letters, probability distributions with upper case. The local mutual information between two observations x and y drawn from random processes X and Y, bearing probability densities ρx, ρy and joint density $\rho_{XY}$ is:

$$LMI(x, y) = \log \frac{\rho_{xy}(x, y)}{\rho_x(x)\rho_y(y)} \quad (1)$$

The LMI integrated over the entire space, probability-weighted, is the mutual information between random variables:

$$I(X;Y) = \int dx dy\, \rho_{XY}(x,y) LMI(x,y) \quad (2)$$

In a baseline application, LMI (S, $V_1$), local information between the model's score S and a set of potentially explanatory observed variable values $V_i$, may be evaluated as a means of distinguishing strongly explanatory (higher values of LMI) verses less explanatory (lower values of LMI) variables. Conceptually, high values of LMI correspond to high co-occurrences of those observed values over the dataset as likely to be explanatory. Negative values mean that the observation of the pair of the two values is less likely than a random choice of each one alone in their marginal values and so we define zero or negative LMI values to be non-explanatory. This objective threshold of non-explainability of a co-occurrence of score and variables is a beneficial feature.

The interpretation of large LMI as highly predictive has a specific meaning connecting to the probabilities of data: The joint probability of score S and the variable V observed together is higher than assuming they were independent, and may be directly checked by an analyst, demonstrated to regulators and explained to customers without needing to invoke the internal intricacies of a machine-learning-based model. Such an explanation model is unlikely to produce unexpected, inconsistent or confusing reasons compared to ones that are overly sensitive to the details of model construction.

The underlying densities $\rho_X$, $\rho_Y$, $\rho_{XY}$ may not be directly known in functional form but may be estimated from observed data sets and trained model scores, and we disclose effective copula-based techniques for high-quality estimation of these densities suitable for use in estimating LMI. In certain embodiments, copula methods may be used as a means to estimate probability functions and probability densities from observed multivariate data. The copula technique separates the task of estimating multivariate densities into a problem of estimating univariate marginal densities multiplied by a copula density function on the unit square which represents the correlation structure between variables alone.

The theory of copulas is defined in terms of cumulative distribution functions, derivatives of which are densities. Observations x and y arising from random processes denoted as X and Y may be transformed individually into the unit interval, with the probability-integral transform: u←$F_X$(x) and v←$F_Y$(y) with $F_X$ and $F_Y$ defined as cumulative distributions of X and Y respectively (so $\rho_X = dF_X/dx$ when existing and similarly for $\rho_Y$). Both u and v are distributed (notated with the relation) uniformly on the unit interval u, v $U_{[0,1]}$. The famous Sklar's theorem says that for continuous bivariate (cumulative) distributions $F_{XY}$, there is a unique copula function C(u, v) such that $F_{XY}(x, y) = C(F_X(x), F_Y(y)) = C(u, v)$.

The copula density function is $$c(u, v) = \frac{\partial^2 C}{\partial u \partial v}(u, v).$$

Connecting to the joint density.

$$\rho_Y(x,y) = \rho_X(x) \cdot \rho_Y(y) \cdot \rho_c(u = F_X(x), v = F_y(y)) \quad (3)$$

Estimating LMI from Equation 1 has a particular advantage, which conveniently is the individual marginal densities x and y cancel, so that we may express LMI as:

$$LMI(x,y) = \log \rho_c(F_X(x), F_Y(y)) \quad (4)$$

The copula density may be estimated from finite sets of observed data. In one embodiment, the estimation procedure for LMI starts with two successively applied empirical transformations. The first transforms from observations, x, y X, Y to uniformly distributed "pseudo-observations" u, v U[0, 1], U[0, 1] by means of an empirical rank transformation, and next, to coordinates with Gaussian distributed marginals, s, t. The first transformation is formed via ranking:

$$u_i \leftarrow \frac{R_X(x_i)}{1+N},$$

with Rx(x)∈[1, N] the index of the value x as it occurs in a sorted array of the observations {$x_i$}. Tied values are assigned the average rank of observations with the same original value. The second transformation is a "probit" transformation: s←$\Phi^{-1}$ (u) and t←$\Phi^{-1}$ (v) with $\Phi$ being the standard normal cumulative distribution function, and $\Phi^{-1}$ is inverse, transforming from (0,1) to (−∞, +∞) (e.g., the "inverse error function").

As to the second transformation, the empirical density estimators in the u, v space, whose support is the unit square, have difficult boundary issues compared to empirical estimation in the s, t space, whose support is unbounded and whose marginals are individually forced to be Gaussian from the double transformation.

In one embodiment, density estimation may be performed using the observations in the Gaussian-marginal s, t space, i.e. estimate a density $\hat{\rho}_G$ (s, t) from a set of observed points in this space. A multi-variate density estimator may be used. In certain embodiments, a Gaussian mixture model, with the number of centers and parameters estimated with variational inference may be used. Its Gaussian basis functions are a good match to distributions observed in modeling tests, particularly on account of the forced Gaussian marginals in the s, t space.

Having obtained this empirical density estimate $\hat{\rho}$(s, t), we undo the effect of the transformation to recover the density in the u, v copula space:

$$\hat{\rho}c(u, v) = \frac{\hat{p}_G(s, t)}{\Phi(s)\Phi(t)} \quad (5)$$

where $\phi(z) = d\Phi(z)/dz = (2\pi)^{1/2} \exp(-z^2/2)$, the standard normal density.

With Equations 4, we have estimated LMI (x,y):

$$LMI(x,y) = \log \hat{\rho}_G(\Phi^{-1}(F_X(x)), \Phi^{-1}(F_Y(y))) - \log [\phi(\Phi^{-1}(F_X(x)) \cdot \phi(\Phi^{-1}(Fy(y)))] \quad (6)$$

This model is parameterized by two one-dimensional transformations, x s=$\Phi^{-1}$ ($F_x$(x)) and similarly for y, each which can be represented as an interpolation table, plus a Gaussian mixture model for density with a finite number of additive components of Gaussian densities. The computational burden to compute LMI values from new inputs is not large: a binary search in a sorted array for each interpolation table plus a small number of Gaussian evaluations. This estimator itself may be approximated further with models that are even cheaper to evaluate or more compact to represent, such as a decision tree, decision tree ensemble, or artificial neural network, for example.

Furthermore, the estimator may be truncated wherever it produces negative estimates, as we will use only the non-negative values, $LMI_+(S;V_i) = \max(LMI(S;V_i), 0)$ in the attribution phase. Our invention is not restricted to copula estimation after a Gaussian space, but this is an example embodiment which is empirically successful and computationally feasible. For a copula estimation consider the computational complexity: for each scalar input a search in a stored database of quantiles and an interpolation (binary search in a sorted list, hence logarithmic in the size of this list), subsequently, evaluation of a small number of Gaussian densities in the mixture model, in practice between five and twenty in many cases. A tree-based, tree-ensemble or neural-network-based approximation to this may be even more efficient, particularly if it maps from the raw input space to approximate $LMI_+$ in one step.

Accordingly, a procedure for attributing explanations to model scores with the simplest variant is provided. In the model development phase, after the predictive model M is trained, the model receives a set of input variables and the score produced by the model is retained. Collectively, the set of scores is denoted as S and the set of input variables as $\{V_i\}$. These sets are collated such that the particular tuple of specific input observations and their corresponding score are retained. An evaluation validation or test set may be provided so that distribution properties will be closer to that expected in production scoring circumstances. For the inputs $V_i$, an explanation model for $LMI_+(S; V_i)$ is estimated with the procedure in the preceding step.

In the production scoring phase:
1. For a particular scoring event, the original predictive model provides a score s from a set of predictive variables $v_i$, $s=M(v_i)$.
2. For each relevant input variable indexed by i, compute the reason strength $r_i=LMI+(s; v_i)=\max(LMI(s; v_i), 0)$. The value of $LMI_+$ is estimated using the LMI model whose parameters were previously fitted during a training phase.
3. Rank variables from largest to smallest positive $r_i$.
4. If a mapping from variables to "reason codes" is provided by the user, and multiple variables may be mapped to the same reason code, deduplicate by retaining only the highest r, scores per unique reason code.
5. Report the explanations remaining after deduplication in descending order by value of $r_i$.

The previous section described the construction of independent models for VRS which examine the relationship between the score and one variable at a time. A claimed extension of the method is using more than one variable at a time, for example examining the predictive relationship between the score and two different scalar inputs, e.g. $V_i$ and $V_j$, $i \neq j$. This can be considered as constructing a vector-valued outer product variable $\tilde{V}=V_i \times V_j$ and estimating a VRS model with the same technique, in this instance, equivalent to modeling and evaluating $LMI(S; V_i, V_j)$. In certain embodiments, one of the variables considered as a candidate explanation for the VRS is, instead of, or in addition to an outer product variable, a composite calculation of one or more model inputs. An example is a hidden unit's activation in an artificial neural network. In our explanation methodology, the composite variable, whether tuple or calculated, and its individual inputs may all be candidate features examined by the VRS as potentially explanatory features for a score.

In certain embodiments, an extension and enhancement may be introduced, when there is additional knowledge about the causal structure of the predictive model M. These nonlinear model structures generate a score which is a function of a set of "hidden features", which are, themselves, functions of the input variables (or other hidden variables), for instance a feed-forward artificial neural network (multi-layer perceptron). For example, a two-layer feed-forward artificial neural network with a final score layer $S=M_2(\{H_i\})$, where a hidden node is itself a function of the observed input variables, $H_i=M_{1,i}(\{V_i\})$. In this circumstance, the causal structure and the values of the hidden variables $H_i$ (which will be computed during the computation of the score) are used to form an improved attribution statistic. The details of the neural network's specific computation beyond the causal flow of computations need not be known in certain embodiments.

As before, estimators for positive LMI between the score and the hidden variables (as if they were variable inputs) may be constructed: $LMI_+(S; H_j)$. For a hidden variable $H_j$ estimators for $LMI_+$ are constructed between the variable and the input variables $V_i$ which have explanations and reason codes attached: $LMI_+(H_j, V_i)$. The fraction of the information traveling to the hidden node $H_j$'s is defined which is attributable specifically to $V_i$ to be:

$$F_{ij} = \frac{LMI_+(H_j; V_i)}{\sum_k LMI_+(H_j; V_k)} \in (0, 1) \tag{7}$$

The refined reason strength of input variable $V_i$, may be defined as $$R_i = \Sigma_j LMI_+(S;H_j) f_{ij} \tag{8}$$

The generated value above may be used to attribute explanations as before. This scheme is clearly extendable to deeper cascades of causal explanations and model structure where inputs have different numbers of causal links between input variable and score. Depending on the particular structure of the model or the regulatory domain, certain composite hidden variables may be associated with palatable explanations on their own—the recursive computation may stop when encountering them and reporting a composite reason code, but continue with other paths of causal influences in the model structure.

Accordingly, a computational technique to attribute the inputs and latent features which are the most significant in an explanation of an observation and the score from a machine learning model are provided. The technique is computationally efficient in a scoring and explanation generation phase and does not require the explicit storage of a set of training data. Further, the machine learning model is not intentionally scored in an area of input space where it has seen no training data and the technique does not depend on the particular technology or algorithm of the machine learning model. This technique uses the probability distribution of data used to train the machine learning model and provides a quantification of the relative strengths of the outputted explanatory variables, in accordance with one or more embodiments. In some implementations, the technique disclosed hereinabove intrinsically provides a natural cutoff that will designate when an input variable is considered to be non-explanatory and allows for the quantification of groups of inputs as collectively explaining the observed score in a potentially non-linear interaction. The technique is invariant to monotonic rescalings of explanatory variables and scores.

Figure 3:
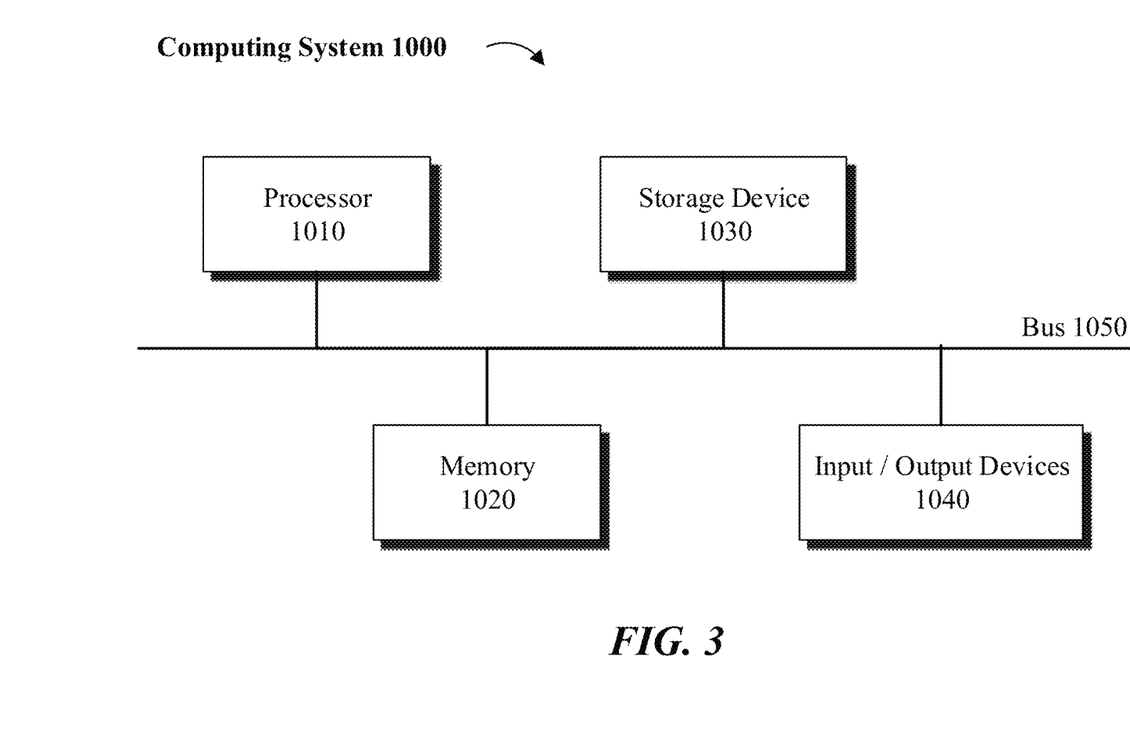
FIG. 3 is a block diagram of a computing system consistent with one or more embodiments.

Referring to FIG. 3, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

As shown in FIG. 3, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A system for providing insights about a machine learning model, the system comprising one or more processors configured for:
   using training data to train the machine learning model to learn patterns to determine whether data associated with an event provides an indication that the event belongs to a certain class from among a plurality of classes;
   evaluating one or more outputs of the machine learning model to produce a data set pairing observed scores S and computing a set of predictive input variables $V_i$ related to the input features of the machine learning model, the data set not identical to the input features of the machine learning model; and
   constructing at least one data-driven estimator based on an explanatory statistic associated with the predictive input variables $V_i$, packaged with the machine learning model, and utilized to provide a definition of explainability for a score generated by the machine learning model,
   the explanatory statistic being a variable relevance statistic (VRS) between the score S and the input variables $V_i$ evaluated as a means of indicating meaningful explanatory variable relationships used by the machine learning model for the generated score and the VRS quantifying the degree of co-occurrence between observed values of the score S and one or more variables $V_i$; and
   performing one or more of a deduplication procedure or an explanatory elucidation procedure to enhance palatability and relevance of the definition of explainability for the score generated by the machine learning model.

2. The system of claim 1, wherein the VRS is computed using a current value of S and one of more variables $V_i$, and one or more parameters estimated from a training dataset providing a multitude of examples of paired S and $V_i$.

3. The system of claim 1, wherein the VRS takes on more extreme values and the score S and one or more variables and combinations $V_i$ take on their observed values simultaneously, normalized by a computation representing the values expected if the score S and combinations variables $V_i$ were observed independently.

4. The system of claim 1, wherein the VRS is computed using probabilities, or probability densities of at least one of S or $V_i$, including at least one of independent, marginal, conditional and joint probability distributions or probability densities.

5. The system of claim 4, wherein the probabilities or probability densities are determined by at least one of a probability estimator or a probability density estimator, wherein the probability estimator is applicable to variables that take on discrete values, and the probability density estimator is applicable to variables that take on continuous values.

6. The system of claim 5, wherein the probability estimator or the probability density estimator is at least one of a multinomial estimator, a histogram estimator, a kernel density estimator, a support vector machine density estimator, a probabilistic mixture model density estimator, a neural network-based density estimator, a parametric mixture model based density estimator, or a Gaussian mixture model based density estimator.

7. The system of claim 5, wherein one or more copula techniques are used for constructing the estimator to eliminate a need for estimating marginal densities in computing the VRS and wherein one or more empirical rank transformations are used for constructing the copula estimator of VRS of the one or more features and the score S.

8. The system of claim 7, wherein a second transformation to Gaussian distributed space from a unit square is used in order to improve quality of estimation.

9. The system of claim 8, wherein a Gaussian mixture model is used to compactly estimate the joint probability and back transformation to original copula space, yielding a compact and computationally efficient density estimator to evaluate the VRS.

10. The system of claim 9, wherein higher values of VRS indicate strong explanatory variables.

11. The system of claim 9, wherein lower values of VRS indicate weak explanatory or non-explanatory variables.

12. The system of claim 9, wherein the VRS is computed using the definition of the local mutual information (LMI) between two observations x and y drawn from random processes X and Y, bearing probability densities $\rho x$, $\rho y$ and joint density $\rho_{XY}$ being defined as follows:

$$LMI(x, y) = \log\frac{\rho_{xy}(x, y)}{\rho_x(x)\rho_y(y)}.$$

13. The system of claim 12, wherein, the LMI integrated over the entire space, probability-weighted, is the mutual information between random variables:

$I(X;Y) = \int dxdy\, \rho_{XY}(x,y) LMI(x,y).$

14. The system of claim 7, wherein the one or more copula techniques used for constructing the estimator eliminate the need for estimating marginal densities in accordance with the following formulas:

copula density $$\text{function} = c(u, v) = \frac{\partial^2 C}{\partial u \partial v}(u, v),$$

connecting to the joint density:

$\rho_Y(x,y) = \rho_X(x) \cdot \rho_Y(y) \cdot \rho_c(u=Fx(x), v=F_y(y)),$ wherein individual marginal densities x and y cancel, such that:

$LMI(x,y) = \log \rho_c(F_X(x), F_Y(y)),$ and wherein the copula density is estimated based on finite sets of observed data.

15. The system of claim 14, wherein a first empirical transformation transforms from observations, x, y (distributed according to random variables X, Y) to uniformly distributed pseudo-observations u, v (each distributed as uniform variates U[0, 1]) by means of an empirical rank transformation.

16. The system of claim 15, wherein the results of transforming to coordinates with a uniform distribution are followed by a transform to coordinates with Gaussian marginal distributions, the first empirical transformation formed via ranking:

$$u_i \leftarrow \frac{R_X(x_i)}{1+N},$$

with $Rx(x) \in [1, N]$ the index of the value x as it occurs in a sorted array of the observations $\{x_i\}$, the second transformation is a probit transformation: $s \leftarrow \Phi^{-1}(u)$ and $t \leftarrow \Phi^{-1}(v)$ with $\Phi$ being the normal cumulative distribution function, and $\Phi^{-1}$ is inverse, transforming from (0, 1) to ($-\infty$, $+\infty$), and wherein one or more probability estimators or probability density estimators are either fitted on training data represented in the transformed coordinates or are one or more of marginal, conditional or joint distributions of the free variables.

17. The system of claim 1, wherein the VRS is used to quantify an explanatory power of pairs, or higher tuples, or derived values calculated from such pairs or higher tuples of input features.

18. The system of claim 1 wherein a cascaded VRS algorithm is used to allocate explanatory statistics when the internal computational structure of information flow is known and the hidden activations are retained for the explanation algorithm.

19. The system of claim 1, wherein the training is performed during a machine learning training phase.

20. The system of claim 1, wherein the evaluating is performed during a machine learning operational phase.

* * * * *